US007575354B2

(12) United States Patent
Woodward

(10) Patent No.: US 7,575,354 B2
(45) Date of Patent: Aug. 18, 2009

(54) THERMAL MANAGEMENT SYSTEM FOR SOLID STATE AUTOMOTIVE LIGHTING

(75) Inventor: Ronald Owen Woodward, Yorktown, VA (US)

(73) Assignee: Magna International Inc., Aurora, Ontario (CA)

( * ) Notice: Subject to any disclaimer, the term of this patent is extended or adjusted under 35 U.S.C. 154(b) by 174 days.

(21) Appl. No.: 11/575,086

(22) PCT Filed: Sep. 16, 2005

(86) PCT No.: PCT/US2005/033043

§ 371 (c)(1), (2), (4) Date: Mar. 12, 2007

(87) PCT Pub. No.: WO2006/033998

PCT Pub. Date: Mar. 30, 2006

(65) Prior Publication Data

US 2008/0094850 A1 Apr. 24, 2008

(51) Int. Cl.
*B60Q 1/00* (2006.01)

(52) U.S. Cl. ....................................... 362/547; 362/545

(58) Field of Classification Search ................ 362/459, 362/507, 543, 544, 545, 547, 294, 800, 296, 362/284

See application file for complete search history.

(56) References Cited

U.S. PATENT DOCUMENTS

| | | | | |
|---|---|---|---|---|
| 5,751,327 | A | 5/1998 | De Cock et al. | |
| 5,924,785 | A * | 7/1999 | Zhang et al. | 362/241 |
| 6,113,212 | A | 9/2000 | Ng | |
| 6,220,722 | B1 | 4/2001 | Begemann | |
| 6,375,340 | B1 | 4/2002 | Biebl et al. | |
| 6,441,943 | B1 * | 8/2002 | Roberts et al. | 359/267 |
| 6,452,217 | B1 | 9/2002 | Wojnarowski et al. | |
| 6,481,874 | B2 | 11/2002 | Petroski | |
| 6,573,536 | B1 | 6/2003 | Dry | |
| 6,578,998 | B2 * | 6/2003 | Zhang | 362/555 |
| 6,871,993 | B2 * | 3/2005 | Hecht | 362/555 |

(Continued)

FOREIGN PATENT DOCUMENTS

| | | | |
|---|---|---|---|
| EP | 1 067 332 | A | 1/2001 |

(Continued)

OTHER PUBLICATIONS

Patent Abstracts of Japan vol. 2003, No. 12, Dec. 5, 2003 & JP 2004 127782 A (Ichikoh Ind Ltd), Apr. 22, 2004 abstract figures.

*Primary Examiner*—Jacob Y Choi
(74) *Attorney, Agent, or Firm*—Clarkhill PLC

(57) ABSTRACT

An automotive lighting system employing semiconductor light sources includes LED light sources (52) which are mounted to an edge of a heat pipe (44) such that emitted light from the LED light sources travels toward a reflector (32) at the back of the housing (24) of the system, where it is reflected and/or focused forward through the lens (40) of the system. The heat pipe is thermally connected to a heat sink (35) which extends outside of the housing and which operates to remove heat from the LED light sources. The thickness of the heat pipe is significantly less than the size of the reflector, so that only a small amount of reflected light from the LED light sources is obscured.

14 Claims, 6 Drawing Sheets

U.S. PATENT DOCUMENTS

| | | | | |
|---|---|---|---|---|
| 6,964,501 | B2 * | 11/2005 | Ryan | 362/294 |
| 7,001,047 | B2 * | 2/2006 | Holder et al. | 362/249.04 |
| 7,114,837 | B2 * | 10/2006 | Yagi et al. | 362/523 |
| 7,144,145 | B2 * | 12/2006 | Watanabe et al. | 362/544 |
| 7,252,408 | B2 * | 8/2007 | Mazzochette et al. | 362/294 |
| 7,258,466 | B2 * | 8/2007 | Watanabe et al. | 362/294 |
| 2002/0136025 | A1 | 9/2002 | Zhang | |
| 2004/0120156 | A1 | 6/2004 | Ryan | |

FOREIGN PATENT DOCUMENTS

| | | | |
|---|---|---|---|
| EP | 1 357 335 | A | 10/2003 |
| WO | WO 03/081127 | A | 10/2003 |

* cited by examiner

THERMAL MANAGEMENT SYSTEM FOR SOLID STATE AUTOMOTIVE LIGHTING

FIELD OF THE INVENTION

The present invention relates to automotive lighting systems. More specifically, the present invention relates to automotive lighting systems, such as headlamps, which employ semiconductor devices as light sources.

BACKGROUND OF THE INVENTION

Semiconductor light sources, such as LEDs, have been employed in automotive warning lamps and the like for some time now. When operated properly, the reliability and efficiency of LED light sources provides significant advantages over conventional incandescent bulbs and the like.

More recently, with improvements in the output of the semiconductor light sources, it has become possible to construct headlamps and other higher output automotive lighting systems with relatively high output LED light sources. However, even with the most recently developed LED light sources, the amount of light emitted by these sources is relatively low and care must be taken to not obscure or otherwise render a significant portion of the emitted light unused.

Further, to obtain the desired level of lumens, these LED light sources are typically operated at the upper end of their performance envelopes. As is well known, semiconductor junctions such as those in LEDs are susceptible to heat. Specifically, the efficiency of an LED decreases as the temperature of its semiconductor junction increases and the lifetime of the LED decreases when it is operated at higher semiconductor junction temperatures compared to its lifetime when operated at lower junction temperatures. These problems are exacerbated with high output LEDs which generate proportionally greater amounts of heat than LEDs with lower outputs, especially when such LED light sources are operated at the upper end of their performance envelopes.

Many different approaches are known to remove heat from LEDs. U.S. Pat. No. 5,751,327 to De Cock et al. shows an LED printer head which includes a water cooled carrier to which the LEDs are mounted. U.S. Pat. No. 6,113,212 to NG shows a similar system for use in color copiers. U.S. Pat. No. 6,220,722 shows an LED bulb which includes multiple LED light sources mounted to a substrate which is, in turn, connected to a column which includes a forced air cooling system. U.S. Pat. No. 6,375,340 to Biebl et al. shows a multi-LED array wherein the LEDs are mounted on a plate of a ceramic substrate which dissipates the heat produced by the elements. U.S. Pat. No. 6,452,217 to Wojnarowski et al. shows an LED flashlight wherein a phase change material is employed to remove heat from LED light sources. U.S. Pat. No. 6,481,874 to Petroski shows an LED lighting system wherein the LED die is thermally connected to a large heat sink. U.S. Pat. No. 6,573,536 shows an LED light system wherein the LEDs are mounted on a hollow tubular mount through which a cooling fluid flows.

While these solutions may be acceptable in many environments, in the environment of higher output automotive lighting systems, such as headlamps, none of these solutions is practical as they either do not readily permit the LED sources to be positioned, as needed, with respect to reflectors and/or lenses, or they are not capable of reliably removing enough heat from closely grouped LED light elements which can be exposed to the wide range of expected ambient temperatures and operating conditions typical for automotive systems.

SUMMARY OF THE INVENTION

It is an object of the present invention to provide a novel automotive lighting system employing semiconductor light sources which obviates or mitigates at least one disadvantage of the prior art.

According to one aspect of the present invention, there is provided an automotive lighting system comprising: a housing; a lens enclosing a forward face of the housing; a heat sink including at least one surface outside the housing to radiate heat; a light source assembly including a heat pipe having a first side, to which an electronic circuit can be attached, and an edge to which at least one semiconductor light source is mounted, the semiconductor light source being electrically connected to an electronic circuit for operating the light source and the heat pipe being thermally connected to the heat sink and to the semiconductor light source; and a reflector within the housing, the reflector being located opposite the lens and facing the edge such that light emitted by the semiconductor light source is reflected past the light source assembly and through the lens.

Preferably, the semiconductor light sources are light emitting diodes (LEDs). Also preferably, the thickness of the edge is substantially less than the size of the reflector, such that the light source assembly does not obscure significant amounts of the light reflected by the reflector.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
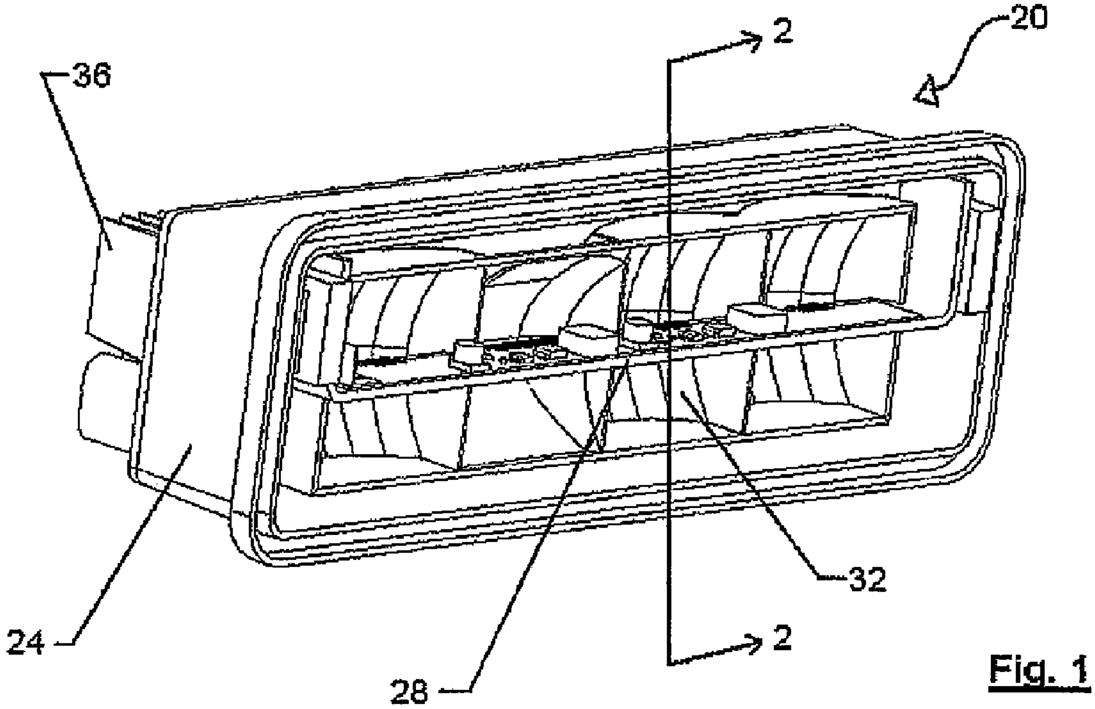
FIG. 1 shows a perspective view of an automotive lighting system in accordance with one embodiment of the present invention.
Figure 2:
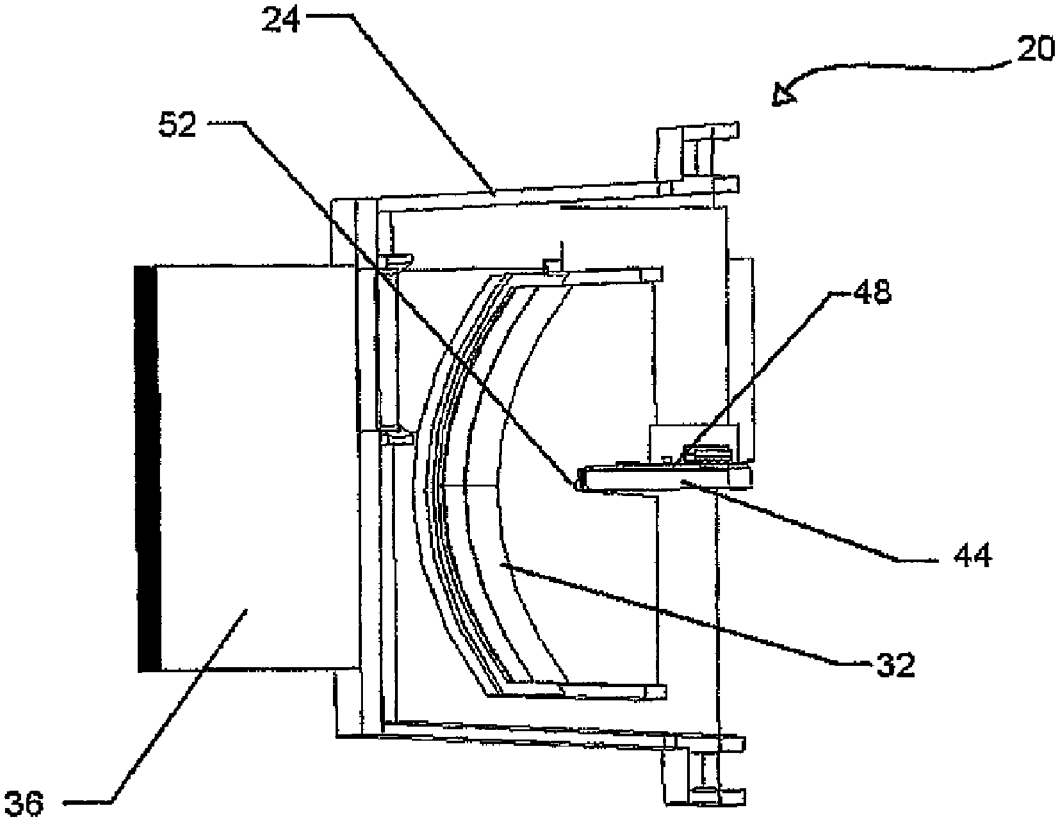
FIG. 2 shows a section, taken through line 2-2 in FIG. 1.
Figure 3:
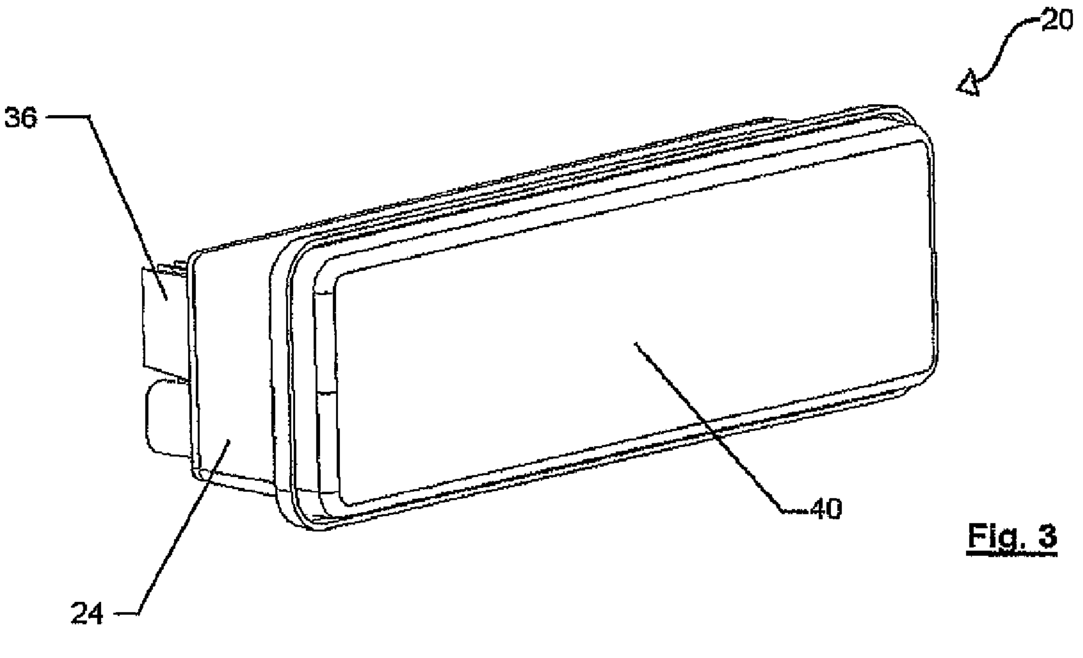
FIG. 3 shows the automotive lighting system of FIG. 1 with a lens in place.

An automotive lighting system, in accordance with one embodiment of the present invention, is illustrated generally at 20 in FIGS. 1 and 2. System 20 includes a housing 24 within which is mounted a light source assembly 28 and a reflector assembly 32. A heat sink 36 is connected to light source assembly 28, as will be described in more detail below, and is mounted to the rear of housing 24. In use, system 20 is provided with a lens 40, as shown in FIG. 3, but lens 40 has been omitted from FIGS. 1 and 2 for clarity.

Figure 4:
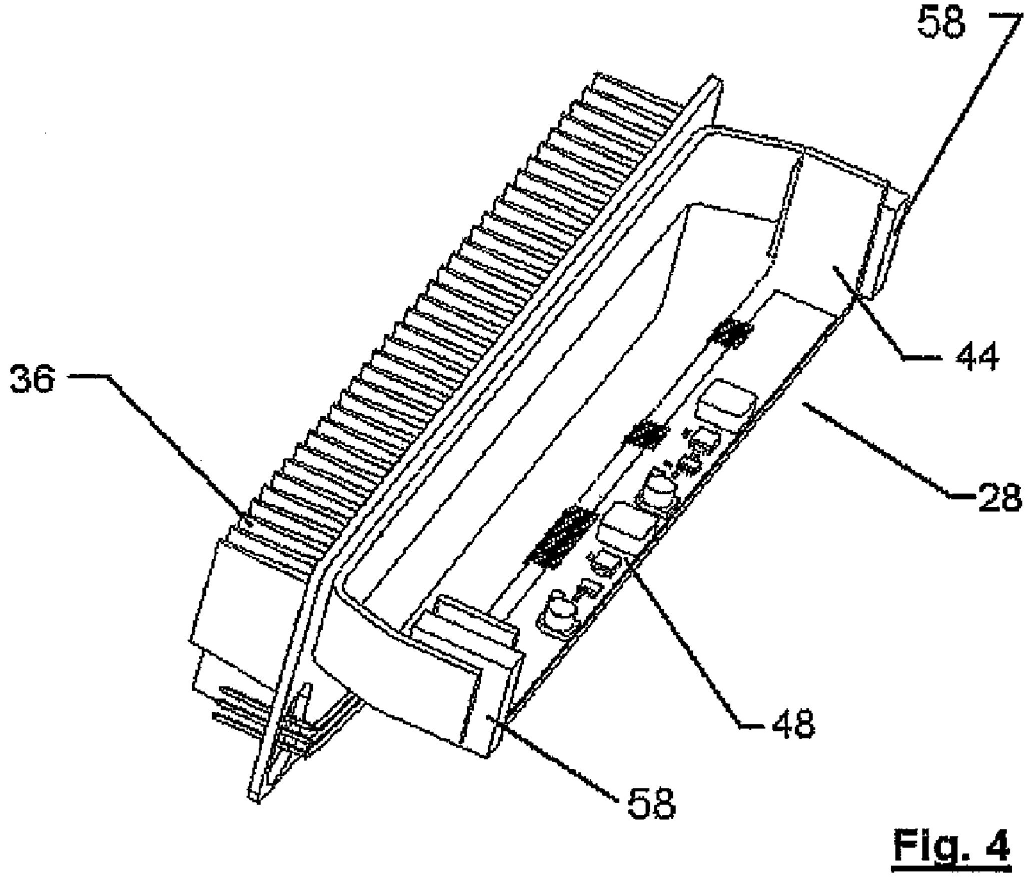
FIG. 4 shows a perspective view of a light source assembly and heat sink of the lighting system of FIG. 1.
Figure 5:
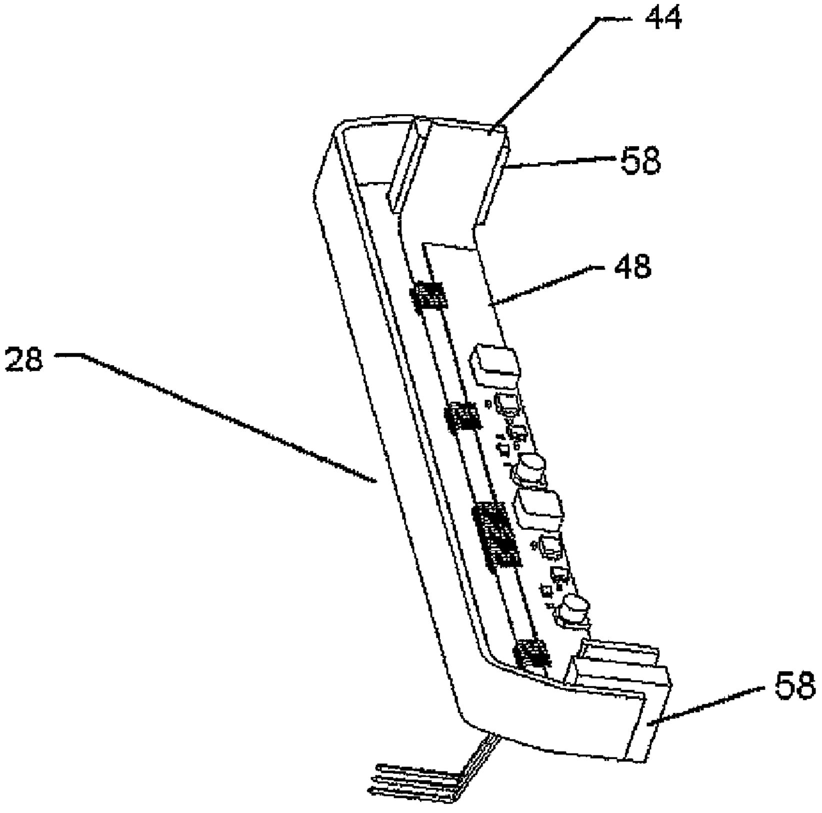
FIG. 5 shows a perspective view of the light source assembly of FIG. 1.

FIG. 4 shows light source assembly 28 and heat sink 36 in more detail, with housing 24 removed for clarity. FIG. 5 shows light source assembly 28 with heat sink 36 removed for clarity. Light source assembly 28 is comprised of a heat pipe 44 to which a circuit board 48 containing necessary circuitry for driving the light sources can be mounted. As will be apparent to those of skill in the art, while it is presently preferred to have circuit board 48 mounted close to the light sources, circuit board 48 does not have to be mounted to heat pipe 44 and circuit board 48 can be mounted at any other convenient location within system 20.

Heat pipe 44 is mounted and thermally connected to heat sink 36 as shown to provide both mechanical support and efficient heat transfer from heat pipe 44 to heat sink 36. Heat pipe 44 is not particularly limited in its construction and can be constructed with any appropriate heat pipe configuration, which can include fluid-filled systems and/or wick-type systems, including cloth, glass, metal wool, sintered metal, grooved wall or other suitable wick systems as will occur to those of skill in the art, provided that heat pipe 44 be of acceptable dimensions and be able to transfer heat to heat sink 36 at an acceptable rate.

Figure 6:
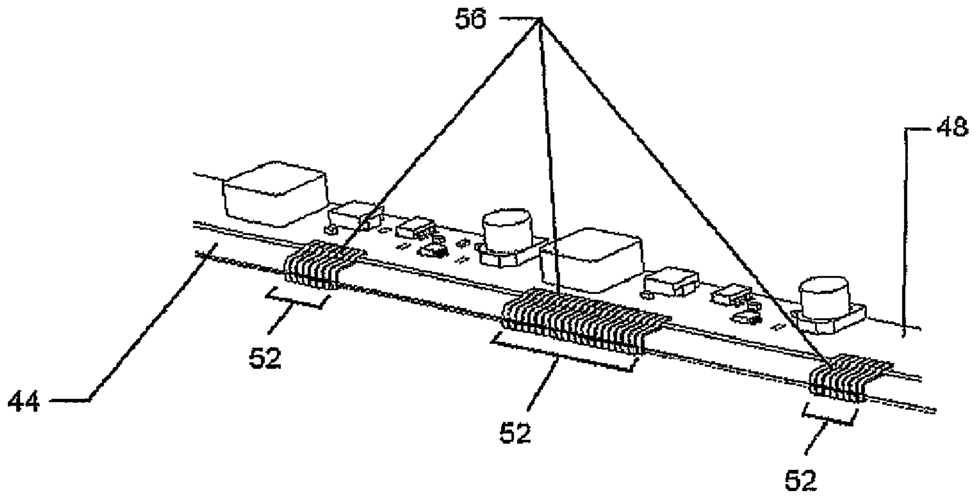
FIG. 6 shows a perspective view of a portion of the light source assembly of FIG. 5.

As best shown in FIGS. 5 and 6, LED light sources 52 are mounted to the side of heat pipe 44 and are connected to circuit board 48 by conductors 56. While multiple LED light sources 52 are illustrated, it is contemplated that as little as one light source 52 can be employed. Conductors 56 can be any suitable conductor, such a flexible conductors, copper jumper wires, etc. as will occur to those of skill in the art.

LED light sources 52 are mounted to the edge of heat pipe 44 to provide efficient heat transfer from LED light sources 52 to heat pipe 44. For example, LED light sources 52 can be mounted to heat pipe 44 via an epoxy with high thermal transmission properties, such as a silver epoxy or a ceramic filled epoxy or by a soldering operation or with a carbon nanotube thermal conductive adhesive, etc. If fabricated from a conductive material, or if coated which such a material, heat pipe 44 can serve as one conductor, such as a ground conductor, for supplying power to LED light sources 52. In such circumstances, the electrical connection between LED light sources 52 and heat pipe 44 can also provide a thermal connection therebetween.

Depending upon the amount of heat which needs to be removed from light sources 52, it is possible that localized hotspots could be formed within heat pipe 44 where the light sources 52 are mounted. The formation of such hotspots is undesired as such hotspots typically prevent the effective transmission of waste heat from light sources 52 to heat pipe 44 and then to heat sink 36. Accordingly, should the formation of such hotspots be possible in a particular configuration, then a thermal spreader can be employed between light sources 52 and heat pipe 44 to transfer heat from the relatively small surface of each light source 52 through the thermal spreader to a larger area of heat pipe 44. The thermal spreader can be a body of any suitable material interposed between light sources 52 and heat pipe 44 to transfer waste heat from light sources 52 to a larger surface area of heat pipe 44. In the embodiment illustrated in FIGS. 5 and 6, conductors 56 are serving a double purpose by acting as a thermal spreader and providing electrical connections to light sources 52. Alternatively, the thickness of the wall of heat pipe 44 to which light sources 52 are mounted can be increased to spread the thermal load if desired.

It is also contemplated that one or more additional thermal engines can be employed between heat pipe 44 and heat sink 36 and/or between heat pipe 44 and light sources 52 to facilitate the transfer of waste heat from light sources 52 to heat sink 36. Such thermal engines can be any suitable device and it presently contemplated that Peltier devices can be employed in this capacity. In FIGS. 4 and 5, Peltier devices 58 are employed to augment the transfer of heat from heat pipe 44 to heat sink 36.

LED light sources 52 can be located and arranged as needed on the edge of heat pipe 44. In the illustrated embodiment, LED light sources 52 are arranged in three groups but, as will be apparent to those of skill in the art, many other arrangements and groupings can be employed as desired or required, depending upon the design of reflector assembly 32, the purpose for the particular LED light sources 52 (i.e. —headlamp high beam formation, low beam formation, or day time running lights, etc.). If the size of LED light sources 52 and the thickness of heat pipe 44 permit, LED light sources 52 can be vertically staggered or otherwise be vertically arranged on the edge of heat pipe 44. LED light sources 52 emit their light towards reflector 32, where it is then reflected and/or focused as need toward the front of system 20, through lens 40.

Referring again to FIG. 2, it can readily be seen that the thickness of heat pipe 44 is much less than the height of reflector 32 and thus heat pipe 44 blocks very little light which is emitted by LED light sources 52 and substantially all of the emitted light can exit system 20 through lens 40.

Heat sink 36 can operate passively to remove heat from heat pipe 44, by passively transferring waste heat to surrounding atmosphere or an active cooling device (not shown), such as a forced air fan and/or air shroud can be employed if required.

It is contemplated that, if desired, multiple light source assemblies 28 can be employed in system 20. For example, it may be desired to have a pair of light source assemblies 28, each on its own respective heat pipe 44, vertically spaced and extending across reflector 32 to meet desired performance and/or styling requirements.

Also, two or more light source assemblies 28 can extend across portions of reflector 32, for example a cantilevered low beam light source assembly 28 could extend across about one half of housing 24, in front of a low beam reflector 32, from one side of housing 24 and a second cantilevered light source assembly 28 could extend across the other half of housing 24, from the opposite side of housing 24 and in the opposite direction, in front of a high beam reflector 32. As will be apparent to those of skill in the art, in the case of a cantilevered light source assembly 28, heat pipe 44 will be cantilevered as well and the design and sizing of such a cantilevered heat pipe 44 must be carefully performed to ensure that adequate heat transfer to heat sink 36 will still be obtained.

By mounting LED light sources 52 to the edge of a heat pipe 44 such that emitted light from LED light sources 52 travels toward a reflector 32 at the back of housing 24 where it is reflected and/or focused forward through lens 40, the present invention provides a reliable and efficient semiconductor-based high output automotive lighting system. Only a small portion of the light reflected by reflector 32 is obscured by heat pipe 44, due to the relative size of reflector 32 compared to the thickness of heat pipe 44.

The above-described embodiments of the invention are intended to be examples of the present invention and alterations and modifications may be effected thereto, by those of skill in the art, without departing from the scope of the invention which is defined solely by the claims appended hereto.

I claim:

1. An automotive lighting system comprising:

a housing having a rearward wall and an opposite forward face;

a lens enclosing said forward face of said housing;

a heat sink including at least one surface outside said housing to radiate heat;

a light source assembly mounted to said housing between said rearward wall and said forward face, said light source assembly including a heat pipe thermally connected to said heat sink and having opposing first and second sides extending between a forward edge facing said forward face and a rearward edge facing said rearward wall of said housing;

at least one semiconductor light source mounted to said rearward edge of said heat pipe and facing said rearward wall of said housing;

an electronic circuit electrically connected to said at least one semiconductor light source for operating said at least one semiconductor light source to emit light; and a reflector mounted within said housing between the rearward wall and the light source assembly, said reflector being located opposite said lens and facing said rearward edge of said heat pipe such that light emitted by said at least one semiconductor light source is reflected off of said reflector, around said light source assembly and through said lens.

2. The automotive lighting system as claimed in claim 1 wherein the height of said forward and rearward edge is substantially less than the size of said reflector.

3. The automotive lighting system as claimed in claim 1 wherein the at least one semiconductor light source is an LED.

4. The automotive lighting system as claimed in claim 1 wherein the heat pipe serves as one conductor in a circuit to power said at least one semiconductor light source.

5. The automotive lighting system as claimed in claim 4 wherein the electrical connection between said at least one semiconductor light source and said heat pipe further serves as a thermal connection therebetween.

6. The automotive lighting system as claimed in claim 1 including at least two light source assemblies.

7. The automotive lighting system as claimed in claim 1 wherein said electronic circuit is mounted on said heat pipe of said light source assembly.

8. The automotive lighting system as claimed in claim 1 including at least two semiconductor light sources.

9. The automotive lighting system as claimed in claim 1 further comprising a thermal engine between said heat sink and said light source assembly.

10. The automotive lighting system as claimed in claim 9 wherein said thermal engine is a Peltier device.

11. The automotive lighting system as claimed in claim 1 further comprising a thermal engine between said at least one semiconductor light source and said light source assembly.

12. The automotive lighting system as claimed in claim 11 wherein said thermal engine is a Peltier device.

13. The automotive lighting system as claimed in claim 1 further comprising a thermal spreader between said at least one semiconductor light source and said light source assembly, said thermal spreader acting to transfer heat from said at least one semiconductor light source to an area of said light source assembly larger than the area of said at least one semiconductor light source.

14. The automotive lighting system as claimed in claim 13 wherein said thermal spreader further acts as at least one of the electrical conductors between said at least one semiconductor light source and said electronic circuit.

* * * * *